(12) United States Patent
Brewer

(10) Patent No.: US 9,687,862 B2
(45) Date of Patent: Jun. 27, 2017

(54) DIRECTIONAL SPRINKLER SYSTEM

(71) Applicant: Bill Brewer, Lake Elsinore, CA (US)

(72) Inventor: Bill Brewer, Lake Elsinore, CA (US)

( * ) Notice: Subject to any disclaimer, the term of this patent is extended or adjusted under 35 U.S.C. 154(b) by 0 days.

(21) Appl. No.: 14/859,799

(22) Filed: Sep. 21, 2015

(65) Prior Publication Data
US 2017/0080437 A1    Mar. 23, 2017

(51) Int. Cl.
*B05B 1/00* (2006.01)
*B05B 1/26* (2006.01)
*A01G 25/00* (2006.01)

(52) U.S. Cl.
CPC .............. *B05B 1/267* (2013.01); *A01G 25/00* (2013.01)

(58) Field of Classification Search
CPC ................ B05B 15/04; B05B 15/0443; B05B 15/04437; B05B 15/001

USPC ....... 239/288, 288.3, 231, 222.13, 666, 504, 239/505
See application file for complete search history.

(56) References Cited

U.S. PATENT DOCUMENTS

| | | | |
|---|---|---|---|
| 3,009,652 A | 11/1961 | McKay | |
| 4,429,832 A | 2/1984 | Sheets | |
| 4,461,423 A * | 7/1984 | Davis | B05B 3/08 239/231 |
| D312,296 S | 11/1990 | Smallwood | |
| 5,039,015 A | 8/1991 | De La Vega, Jr. | |
| D418,577 S * | 1/2000 | Davis | D23/227 |
| 6,336,599 B1 * | 1/2002 | Herr | B05B 15/0443 239/505 |
| 7,066,404 B1 | 6/2006 | Kollar | |
| 2013/0020409 A1 | 1/2013 | Bartlett | |

* cited by examiner

*Primary Examiner* — Arthur O Hall
*Assistant Examiner* — Viet Le

(57) ABSTRACT

A directional sprinkler system for facilitating directional control of a sprinkler includes a sprinkler head that may spray a fluid. A shield is removably coupled to the sprinkler head. The shield directs the fluid in a selected direction with respect to the sprinkler head.

9 Claims, 4 Drawing Sheets

DIRECTIONAL SPRINKLER SYSTEM

BACKGROUND OF THE DISCLOSURE

Field of the Disclosure

The disclosure relates to sprinkler devices and more particularly pertains to a new sprinkler device for facilitating directional control of a sprinkler.

SUMMARY OF THE DISCLOSURE

An embodiment of the disclosure meets the needs presented above by generally comprising a sprinkler head that may spray a fluid. A shield is removably coupled to the sprinkler head. The shield directs the fluid in a selected direction with respect to the sprinkler head.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
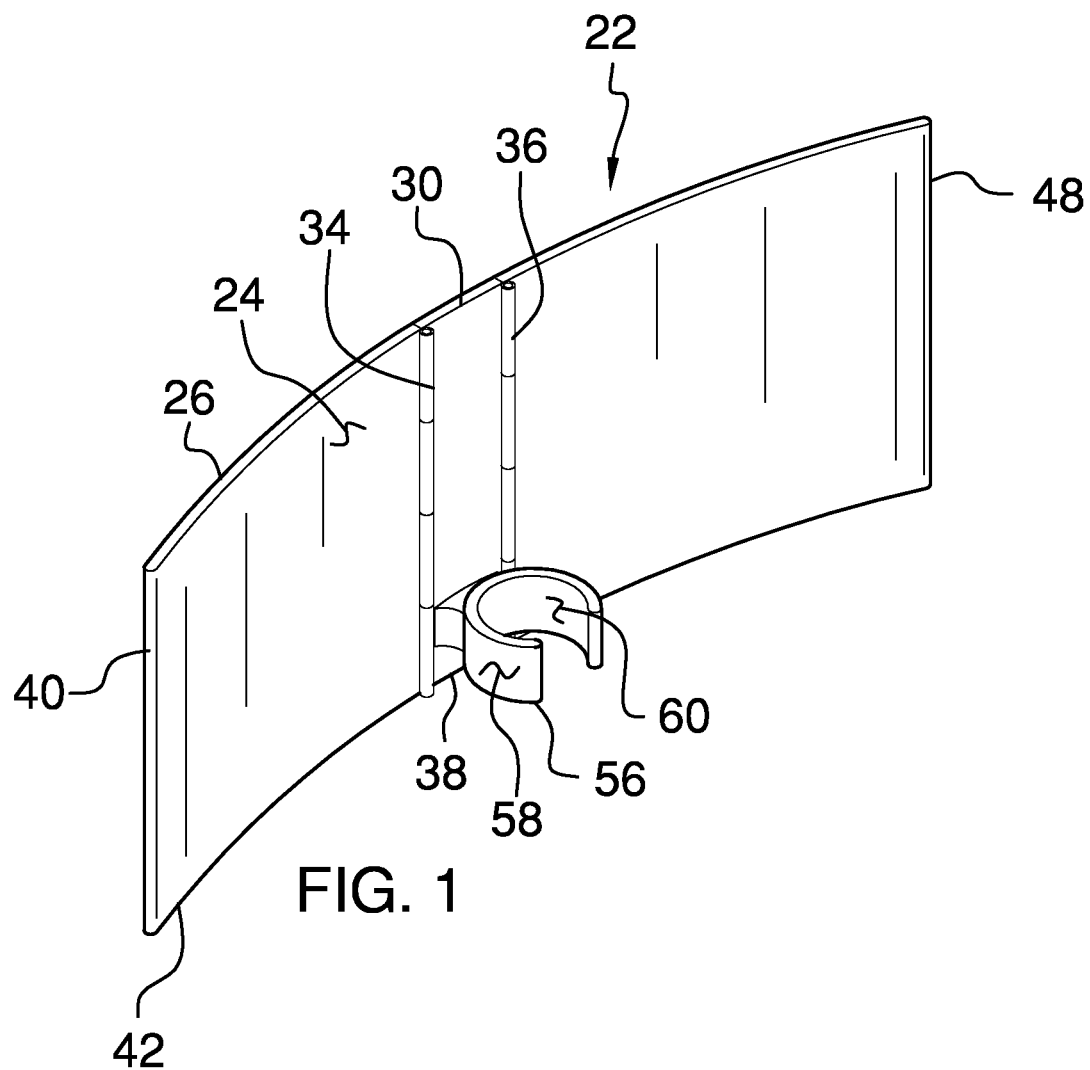
FIG. 1 is a front perspective view of a directional sprinkler system according to an embodiment of the disclosure.
Figure 2:
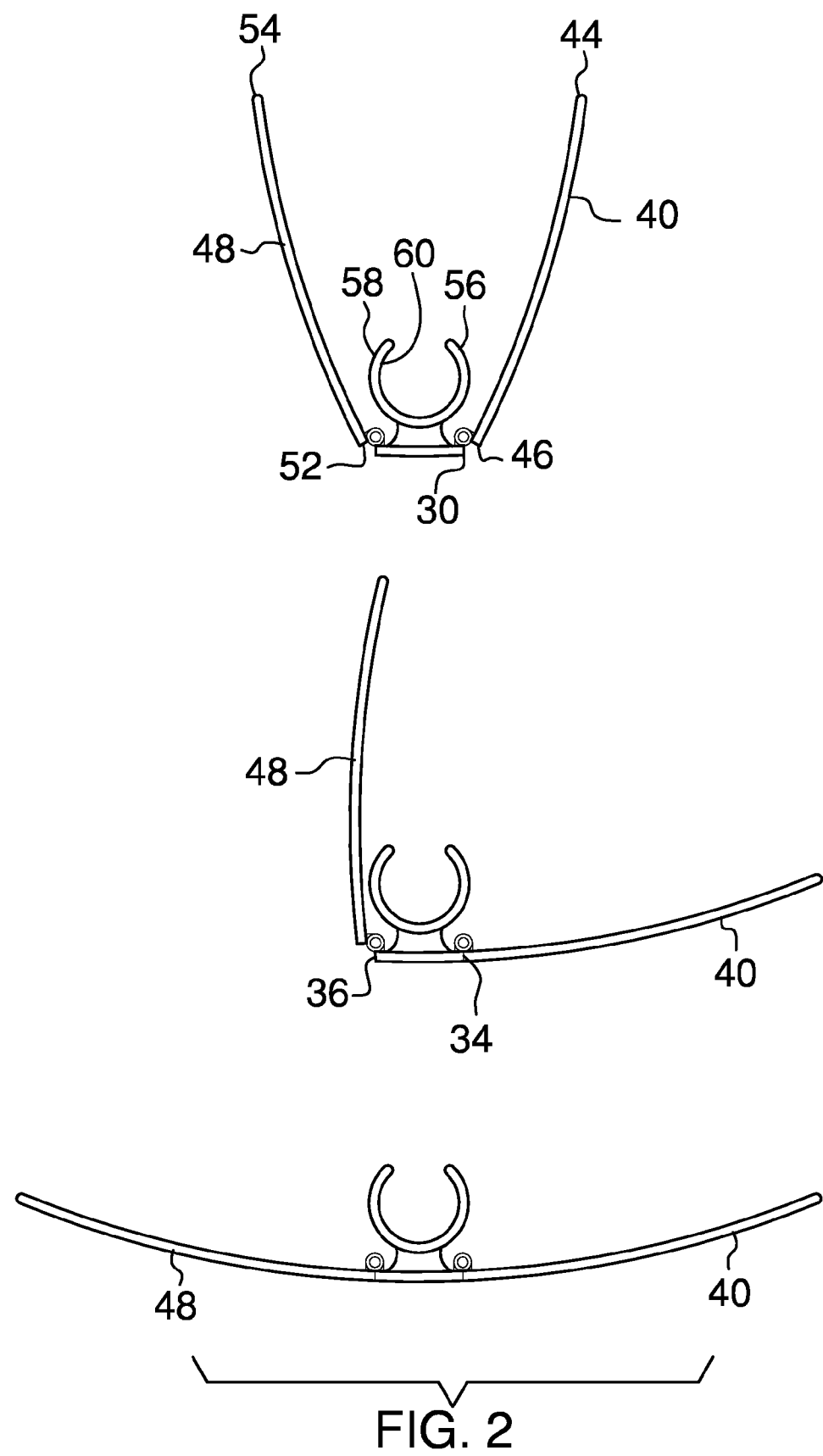
FIG. 2 is a top view of an embodiment of the disclosure.
Figure 3:
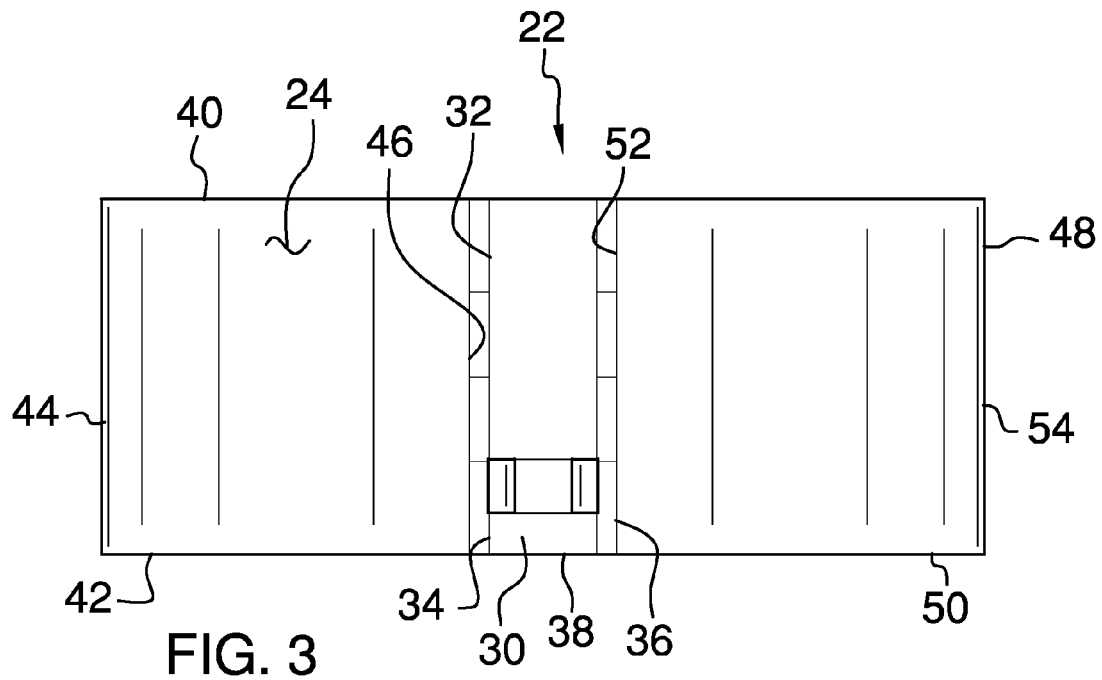
FIG. 3 is a front view of an embodiment of the disclosure.
Figure 4:
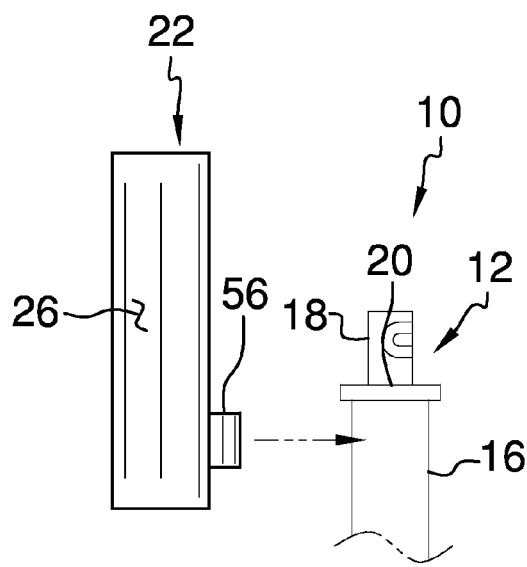
FIG. 4 is a right side view of an embodiment of the disclosure.
Figure 5:
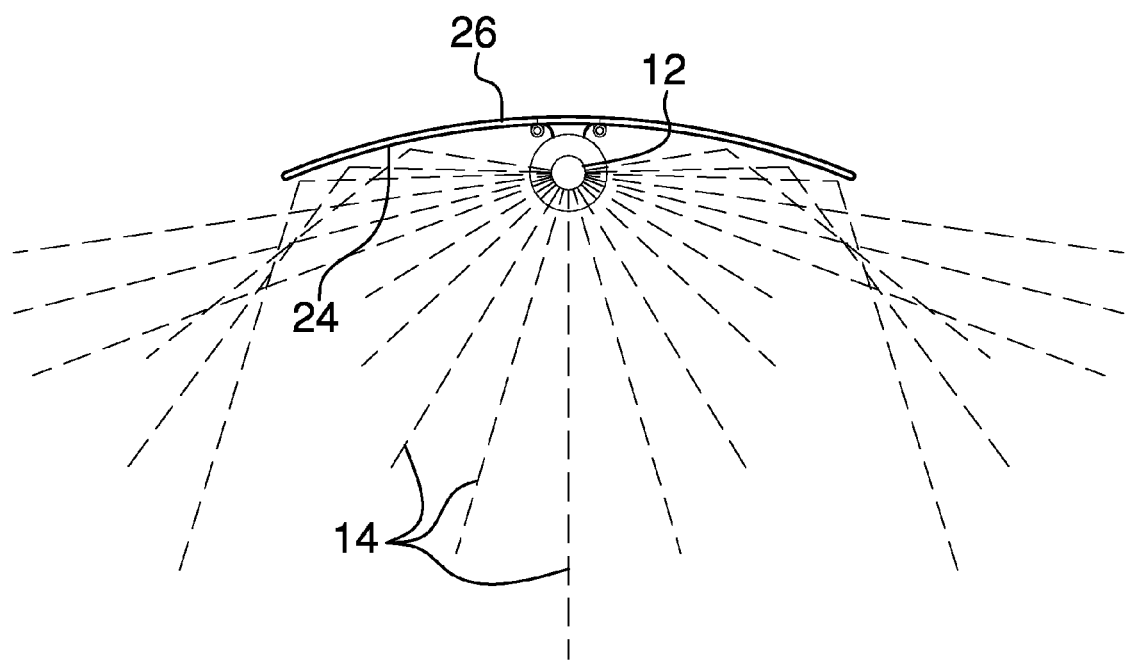
FIG. 5 is a perspective in-use view of an embodiment of the disclosure.

With reference now to the drawings, and in particular to FIGS. 1 through 5 thereof, a new sprinkler device embodying the principles and concepts of an embodiment of the disclosure and generally designated by the reference numeral 10 will be described.

As best illustrated in FIGS. 1 through 5, the directional sprinkler system 10 generally comprises a sprinkler head 12 that may spray a fluid 14. The fluid 14 may be water and the sprinkler head 12 may be used to irrigate a crop. The crop may comprise a lawn, flower bed or other crop. The sprinkler head 12 has a body 16 and a nozzle 18. The body 16 has a top end 20. The nozzle 18 extends upwardly from the top end 20 and the nozzle 18 sprays the fluid 14 outwardly therefrom. The sprinkler head 12 may be an automatically controlled sprinkler head or the like.

A shield 22 is removably coupled to the sprinkler head 12. The shield 22 directs the fluid 14 in a selected direction with respect to the sprinkler head 12. The shield 22 has a first surface 24 and a second surface 26. Each of the first surface 24 and the second surface 26 is curved such that the shield 22 forms a segment of a circle. The shield 22 comprises a panel 28 that has a peripheral edge 32. The peripheral edge 32 has a first lateral side 34, a second lateral side 36 and a bottom side 38.

A first wing 40 is provided and the first wing 40 has a peripheral edge 42. The peripheral edge 42 of the first wing 40 has a first lateral side 44 and a second lateral side 46. The second lateral side 46 of the first wing 40 is hingedly coupled to the first lateral side 34 of the panel 28. The first wing 40 is positionable in an extended position and an angled position with respect to the panel 28.

The first surface 24 corresponding to the first wing 40 is co-arcuate with the first surface 24 corresponding to the panel 28 when the first wing 40 is positioned in the extended position. The first surface 24 corresponding to the first wing 40 forms a selected inside angle with respect to the first surface 24 corresponding to the panel 28 when the first wing 40 is positioned in the angled position. The selected inside angle may be an angle ranging between approximately ninety degrees and one hundred eighty degrees.

A second wing 48 is provided and the second wing 48 has a peripheral edge 50. The peripheral edge 50 of the second wing 48 has a first lateral side 52 and a second lateral side 54. The first lateral side 52 of the second wing 48 is hingedly coupled to the first lateral side 34 of the panel 28. The second wing 48 is positionable in an extended position and an angled position with respect to the panel 28. The shield 22 forms the segment of the circle when each of the first wing 40 and the second wing 48 are positioned in the extended position.

The first surface 24 corresponding to the second wing 48 is co-arcuate with the first surface 24 corresponding to the panel 28 when the second wing 48 is positioned in the extended position. The first surface 24 corresponding to the second wing 48 forms a selected inside angle with respect to the first surface 24 corresponding to the panel 28 when the second wing 48 is positioned in the angled position. The selected inside angle may be an angle ranging between approximately ninety degrees and one hundred eighty degrees.

A clip 56 is provided and the clip 56 has a rear surface 58 and a front surface 60. The rear surface 58 and the front surface 60 are curved such that the clip 56 forms an open ring. The rear surface 58 is coupled to the first surface 24 of the panel 28 and the clip 56 is positioned adjacent to the bottom side 38 of the panel 28. The clip 56 removably engages the body 16 of the sprinkler head 12. Thus, each of the first wing 40 and the second wing 48 direct the fluid 14 in a selected direction. The selected direction corresponds to the selected inside angle between the first wing 40 and the panel 28 and the selected inside angle between the second wing 48 and the panel 28. The clip 56 is positioned adjacent to the top end 20 of the sprinkler head 12 such that the shield 22 extends upwardly from the sprinkler head 12.

The hinged coupling of the first wing 40 frictionally engages the hinged coupling of the panel 28 when the first wing 40 is positioned in the angled position. Thus, the first wing 40 resists being urged into the extended position when the fluid 14 is sprayed against the first wing 40. The hinged coupling of the second wing 48 frictionally engages the hinged coupling of the panel 28 when the second wing 48 is positioned in the angled position. Thus, the second wing 48 resists being urged into the extended position when the fluid 14 is sprayed against the second wing 48.

In use, the clip 56 is attached to the body 16 of the sprinkler head 12. Selected ones of the first wing 40 and the second wing 48 are positioned in the angled position if the fluid 14 is to be being sprayed in a selected direction. Thus, the fluid 14 is restricted from being sprayed in an undesired direction. The first wing 40 and the second wing 48 are positioned in the extended position if the fluid 14 may be sprayed in an unrestricted direction.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A directional sprinkler system comprising:
a sprinkler head being configured to spray a fluid; and
a shield being removably coupled to said sprinkler head wherein said shield is configured to direct the fluid in a selected direction with respect to said sprinkler head, said shield comprising a panel having a peripheral edge, said peripheral edge having a first lateral side, a second lateral side and a bottom side; and
a clip having a rear surface and a front surface, said rear surface and said front surface being curved such that said clip forms an open ring, said rear surface being coupled to said first surface of said panel such that said clip extends substantially perpendicularly from said first surface wherein said clip is laterally spaced from said first surface and said clip is positioned laterally aligned with said panel, said clip being positioned adjacent to said bottom side.

2. The system according to claim 1, wherein said sprinkler head has a body and a nozzle, said body having a top end, said nozzle extending upwardly from said top end wherein said nozzle is configured to spray a fluid outwardly therefrom.

3. The system according to claim 1, wherein said shield has a first surface and a second surface, each of said first surface and said second surface being curved such that said shield forms a segment of a circle.

4. The system according to claim 1, further comprising a first wing having a peripheral edge, said peripheral edge of said first wing having a first lateral side and a second lateral side, said second lateral side of said first wing being hingedly coupled to said first lateral side of said panel such that said first wing is positionable in an extended position and an angled position.

5. The system according to claim 4, wherein:
said shield has a first surface; and
said first surface corresponding to said first wing is co-arcuate with said first surface corresponding to said panel when said first wing is positioned in said extended position, said first surface corresponding to said first wing forming a selected inside angle with respect to said first surface corresponding to said panel when said first wing is positioned in said angled position.

6. The system according to claim 1, further comprising a second wing having a peripheral edge, said peripheral edge of said second wing having a first lateral side and a second lateral side, said first lateral side of said second wing being hingedly coupled to said first lateral edge of said panel such that said second wing is positionable in an extended position and an angled position.

7. The system according to claim 6, wherein:
said shield has a first surface; and
said first surface corresponding to said second wing is co-arcuate with said first surface corresponding to said panel when said second wing is positioned in said extended position, said first surface corresponding to said second wing forming a selected inside angle with respect to said first surface corresponding to said panel when said second wing is positioned in said angled position.

8. The system according to claim 1, wherein:
said sprinkler head has a body and a top end;
said shield has a first wing and a second wing, each of said first wing and said second wing being positionable at a selected inside angle with respect to said panel; and
said clip removably engaging said body of said sprinkler head wherein each of said first wing and said second wing are configured to direct the fluid in a direction corresponding to said selected inside angle between said first wing and said panel and said selected inside angle between said second wing and said panel, said clip being positioned adjacent to said top end such that said shield extends upwardly from said sprinkler head.

9. A directional sprinkler system comprising:
a sprinkler head being configured to spray a fluid, said sprinkler head having a body and a nozzle, said body having a top end, said nozzle extending upwardly from said top end wherein said nozzle is configured to spray a fluid outwardly therefrom; and
a shield being removably coupled to said sprinkler head wherein said shield is configured to direct the fluid in a selected direction with respect to said sprinkler head, said shield having a first surface and a second surface, each of said first surface and said second surface being curved such that said shield forms a segment of a circle, said shield comprising:
a panel having a first surface and a peripheral edge, said peripheral edge having a first lateral side, a second lateral side and a bottom side,
a first wing having a peripheral edge, said peripheral edge of said first wing having a first lateral side and a second lateral side, said second lateral side of said first wing being hingedly coupled to said first lateral side of said panel such that said first wing is positionable in an extended position and an angled position, said first surface corresponding to said first wing is co-arcuate with said first surface corresponding to said panel when said first wing is positioned in said extended position, said first surface corresponding to said first wing forming a selected inside angle with respect to said first surface corresponding to said panel when said first wing is positioned in said angled position, a second wing having a peripheral edge, said peripheral edge of said second wing having a first lateral side and a second lateral side, said first lateral side of said second wing being hingedly coupled to said first lateral edge of said panel such that said second wing is positionable in an extended position and an angled position, said first surface corresponding to said second wing is co-arcuate with said first surface corresponding to said panel when said second wing is positioned in said extended position, said first surface corresponding to said second wing forming a selected inside angle with respect to said first surface corresponding to said panel when said second wing is positioned in said angled position, and a clip having a rear surface and a front surface, said rear surface and said front surface being curved such that said clip forms an open ring, said rear surface being coupled to said first surface of said panel such that said clip extends substantially perpendicularly from said first surface wherein said clip is laterally spaced from said first surface and said clip is positioned laterally aligned with said panel, said clip being positioned adjacent to said bottom side, said clip removably engaging said body of said sprinkler head wherein each of said first wing and said second wing are configured to direct the fluid in a direction corresponding to said selected inside angle between said first wing and said panel and said selected inside angle between said second wing and said panel, said clip being positioned adjacent to said top end such that said shield extends upwardly from said sprinkler head.

* * * * *